United States Patent

Karp

[11] Patent Number: 5,437,148
[45] Date of Patent: Aug. 1, 1995

[54] IMPROVEMENT IN ROLLER CHAINS

[76] Inventor: Stefan Karp, 37 Glenfield Road, Luton, Bedfordshire, Great Britain, LU3 2HZ

[21] Appl. No.: 204,384
[22] PCT Filed: Oct. 12, 1992
[86] PCT No.: PCT/GB92/01863
 § 371 Date: Mar. 15, 1994
 § 102(e) Date: Mar. 15, 1994
[87] PCT Pub. No.: WO93/08417
 PCT Pub. Date: Apr. 29, 1993

[30] Foreign Application Priority Data
Oct. 16, 1991 [GB] United Kingdom ............. 9121909

[51] Int. Cl.$^6$ ............................................. F16G 13/02
[52] U.S. Cl. ........................................ 59/78; 59/5; 474/209
[58] Field of Search .................. 59/4, 5, 78; 474/207, 474/209, 232, 235

[56] References Cited

U.S. PATENT DOCUMENTS

| 629,515 | 7/1899 | Macdonald | 474/207 |
|---|---|---|---|
| 2,589,015 | 3/1952 | Merz | 59/5 |
| 2,816,453 | 12/1957 | Frank | 474/207 |
| 3,231,069 | 1/1966 | Lanham | 474/207 |
| 3,847,031 | 11/1974 | Araya | 474/207 |
| 4,272,952 | 6/1981 | Graham | 59/84 |
| 4,571,228 | 2/1986 | Tracy | 474/231 |
| 4,615,171 | 10/1986 | Burk | 59/4 |
| 4,863,418 | 9/1989 | Fillar et al. | 474/207 |
| 4,978,327 | 12/1990 | Wu | 59/4 |

FOREIGN PATENT DOCUMENTS

| 0214948 | 3/1987 | European Pat. Off. . |
|---|---|---|
| 0397503 | 11/1990 | European Pat. Off. . |
| 1064570 | 5/1954 | France . |
| 0071743 | 6/1978 | Japan ............. 59/4 |
| 000847 | 1/1983 | Japan ............. 59/4 |
| 0206848 | 9/1986 | Japan ............. 59/4 |
| 2118270 | 10/1983 | United Kingdom . |

Primary Examiner—David Jones
Attorney, Agent, or Firm—Harrison & Egbert

[57] ABSTRACT

A chain including a plurality of pairs of inner and outer link plates interconnected by pivot pins extending through aligned apertures in the inner and outer link plates. A roller surrounds each pivot pin between the inner link plates. The roller is integral with the pivot pin. An aperture of each of the outer link plates is formed with an inwardly extending tubular protrusion. This protrusion is received within an aperture of an adjoining inner link plate. The roller is rotatable relative to the link plates.

7 Claims, 1 Drawing Sheet

U.S. Patent  Aug. 1, 1995  5,437,148
FIG. 1
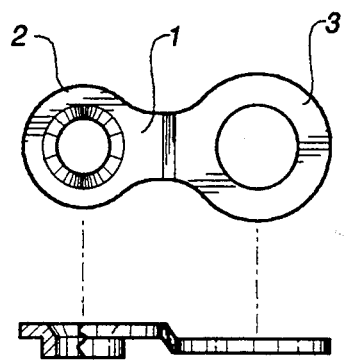
FIG. 2
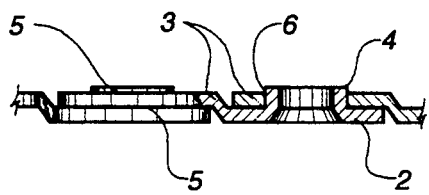
FIG. 3
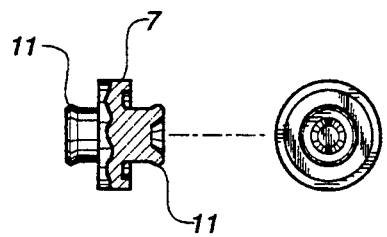
FIG. 4
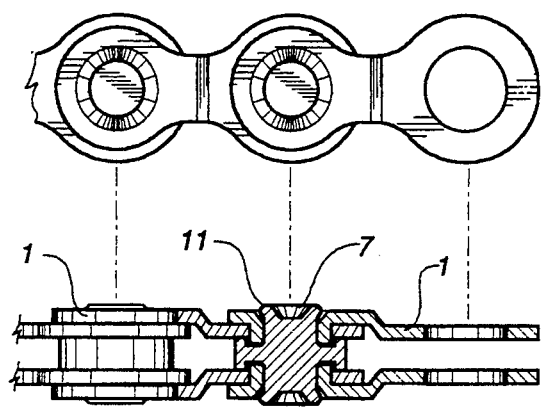
FIG. 5
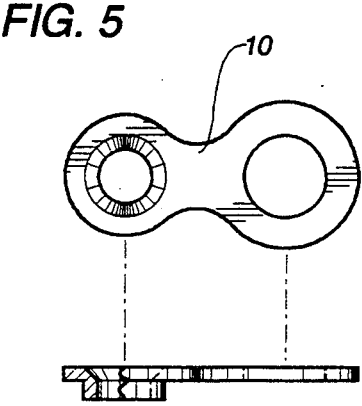
FIG. 6
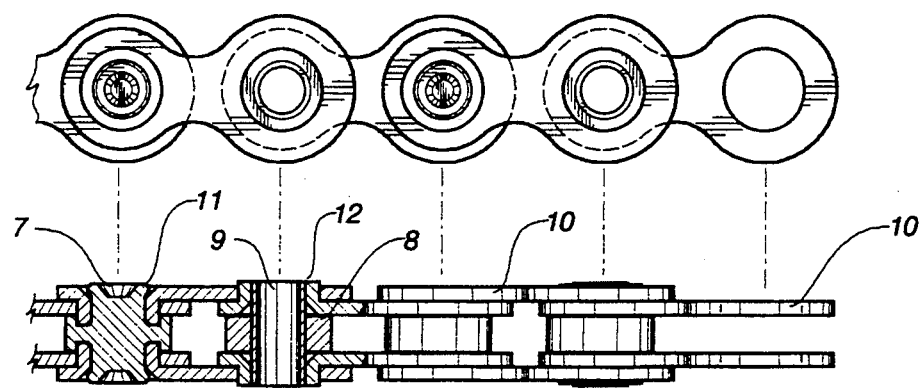
FIG. 7

IMPROVEMENT IN ROLLER CHAINS

TECHNICAL FIELD

This invention relates to an oil free chain.

BACKGROUND ART

One disadvantage that the power transmitting metal chain in general use has, is that it requires lubrication both for the chain roller (for example—roller/chainwheel teeth, roller/pin, roller/link plates) and for the chain link plates (for example—link plate/link plate, inner link plate/roller, inner link plate/pin) in respect of their relative movements.

SUMMARY OF THE INVENTION

This invention proposes a novel design in an effort to eliminate completely the 'wet' lubrication, at the same time reducing the number of individual components needed to make the chain, bearing in mind the primary function of the chain (for example—the ability to transmit the required forces safely and reliably, having a reasonable service life and some increase in the service life of the mating embodiments such as the driving and driven chainwheels and the ability to function in environments in which existing chains would not be suitable)—To use a modern expression—An Environmentally Friendly Chain.

According to the present invention there is provided a chain comprising a plurality of pairs of inner and outer link plates inter-connected by pivot pins extending through aligned apertures in said inner and outer link plates, and roller means surrounding each pivot pin between said inner link plates characterized in that at least some of said pivot pins are formed integrally with the associated roller means.

BRIEF DESCRIPTION OF THE DRAWINGS

The invention is now explained with reference to the accompanying drawings in which:

FIG. 1 shows two views of the single link plate employed.

FIG. 2 shows one view, partly in section, to illustrate the method of assembling the link plates.

FIG. 3 shows two views, one partly in section, to illustrate the integral roller and pin employed.

FIG. 4 shows two views to illustrate a two component chain assembled.

FIG. 6 shows two views of the link plate employed in the chain shown in FIG. 7.

FIGS. 5 and 7 show two views to illustrate a four component chain assembled.

Referring to the drawings, as shown in FIG. 4, the two component chain is made from link plate 1—shown in FIG. 1 that is employed to form the chain whose design and manufacture is such that longitudinal forces are carried by the link plates alone—a fundamental difference from existing chains performing similar duties.

The link plate is made from suitable polymer for relatively low working forces and temperatures. Also in applications where its weight, non-magnetic property and ability to function without special surface protection in a wide range of atmospheric and liquid environments, are of paramount importance. The link plate is also made from suitable non-ferrous metals where forces to be supported are higher than those offered to the polymer link plate but not as high as the ferrous link plate can support. The particular non-ferrous metal will be selected according to the environment in which the chain will operate. In an application such as the bicycle, for example, where working stresses are high, the link plate can be made from stainless steels.

Other material (non-metallic and polymeric) will be employed for special applications; the high temperature environment being a typical example.

In FIG. 2 end 2 of one link plate 1 is assembled with end 3 of another similar link plate 1. The difference in size of ends 2 and 3 is to assist in the assembling of the metallic links by the light/swaged head 4, yet maintaining axial clearance 5 necessary for the relative rotational movement of assembled ends 2 and 3.

In the case of the polymer link plate, the head 4 would be moulded since temporary deformation of head 4 will permit assembling. Some polymers, however, will need some heating to produce the head 4.

As a chain has to be shortened or lengthened, ends 2 and 3 will be separated by forcing them apart. Polymer chain link plates are separated and reassembled employing just the necessary relevant forces.

Metallic link plates may require a small amount of filing of the swaged head circumference 6 when reassembling the link plates.

For certain applications of the chain link plates, a dry permanent lubricant such as PTFE, MoS2 or similar or interposed membrane will be added or coated to the relevant surfaces before assembling the link plates.

The typical integral chain roller and pin 7 as shown in FIGS. 3, 4 and 6 will, in most cases, be made from suitable polymers.

In FIG. 4 the assembled link plates 1 shown in FIG. 2 are finally joined with the integral rollers and pins 7 to complete the chain. This is a chain that in certain applications of moderate forces and requirement of minimum width can be made entirely from polymers.

For applications where extreme axial forces are involved a straight link plate 10 is employed with alternating integral roller and pin 7 and the typical roller 8 and typical pin 9 as shown in FIG. 6.

Lateral restraint of link plates is achieved for both integral roller and pin 7 and metal pin 9, by the moulded, or during assembling, enlarged ends 11 and 12 respectively, shown in FIGS. 3, 4, 5 and 6.

All chains will be assembled on high speed fully automatic special purpose equipment.

One additional function that pin 9 employed on the four component chain, will perform (if hollow) is acceptance of various attachments such as conveying and/or actuating fixtures and similar.

The shortening/lengthening of all chains will be performed employing suitable tools.

Shortening and lengthening the two component chain requires the removal of one pair of link plates 1, whereas the four component chain requires the removal of two pairs of link plates 10.

The chains will be manufactured to the National and International relevant standards available.

I claim:

1. A chain comprising:
   a first inner link plate and a second inner link plate, said first inner link plate having an aperture coaxially aligned with an aperture of said second inner link plate;
   a first outer link plate and a second outer link plate, said first outer link plate adjoining an outer surface of said first inner link plate, said second outer link plate adjoining an outer surface of said second inner link plate, said first outer link plate having an aperture coaxially aligned with the apertures of said inner link plates and with an aperture of said second outer link plate, each of the apertures of said outer link plates having an inwardly extending tubular protrusion, the protrusion of said first outer link plate received by the aperture of said first inner link plate, the protrusion of said second outer link plate received by the aperture of the said second inner link plate, said tubular protrusion directly receiving a portion of an axial force applied to said inner link plates;

a pivot pin extending through the apertures of said first and second inner link plates and the apertures of said first and second outer link plates; and a roller surrounding said pivot pin between said first and second inner link plates, said roller being integrally formed with said pivot pin, said roller rotatable relative to said plates.

2. The chain of claim 1, said first and second inner link plates and said first and second outer link plates all having an identical configuration.

3. A chain as claimed in claim 1, wherein said inner and outer link plates are made from polymeric material.

4. A chain as claimed in claim 1, wherein said inner and outer link plates are made from stainless steel.

5. A chain as claimed in claim 1, wherein said inner and outer link plates are made of metal coated with a dry lubricant.

6. A chain as claimed in claim 5, wherein said dry lubricant comprises PTFE or Molybdenum disulphide.

7. A chain as claimed in claim 1, wherein said inner and outer link plates are made from non-ferrous metals.

* * * * *